May 14, 1963  W. P. KUSHMUK ETAL  3,089,295
BRAKE SHOE CLAMP
Filed June 5, 1961  3 Sheets-Sheet 1
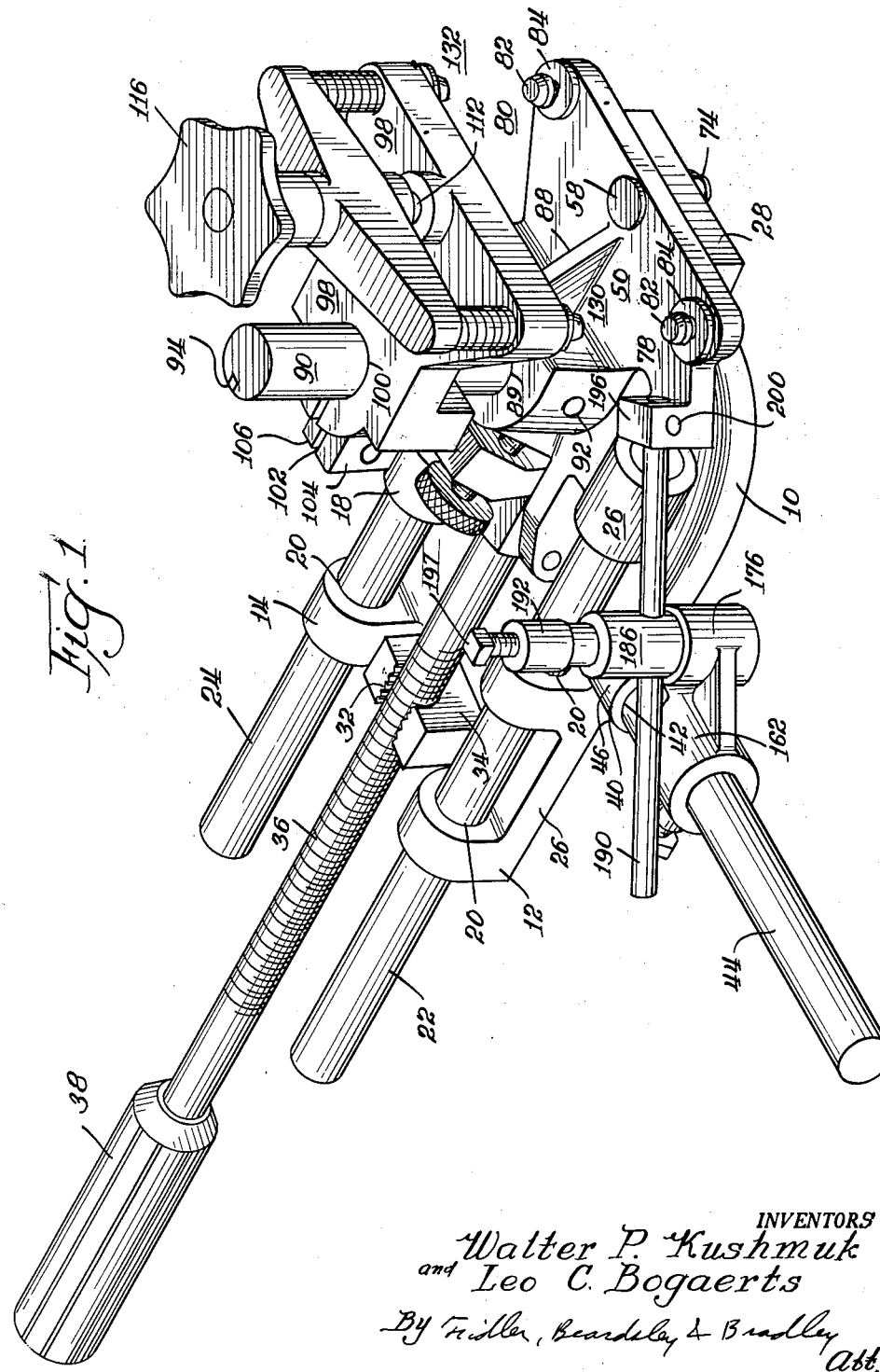
INVENTORS
Walter P. Kushmuk
and Leo C. Bogaerts
By Fidler, Beardsley & Bradley
Att'ys

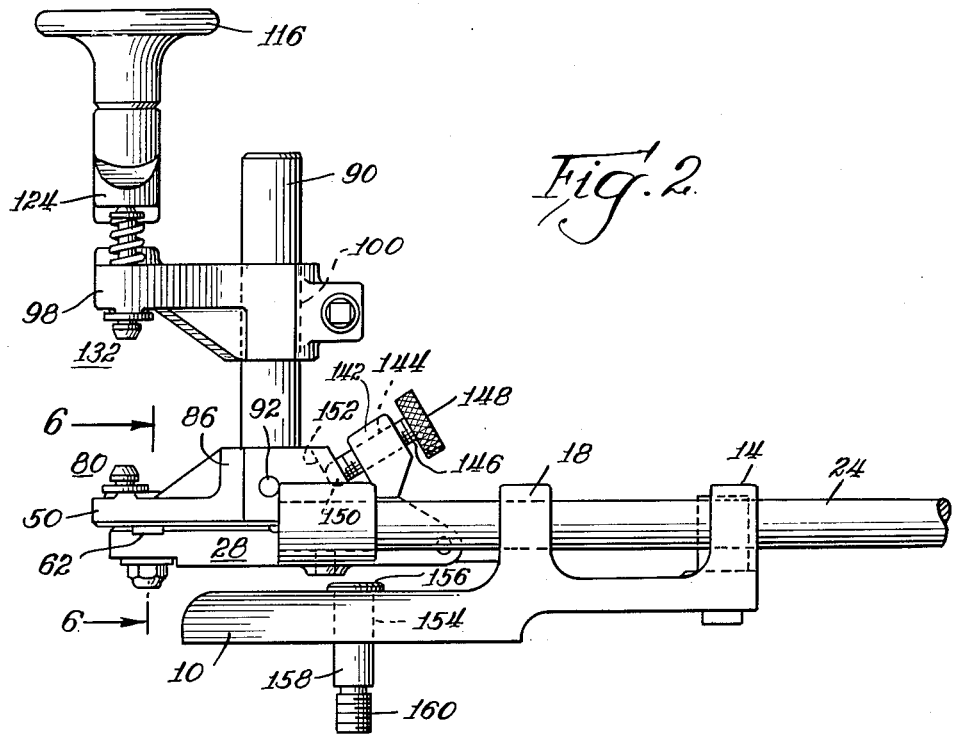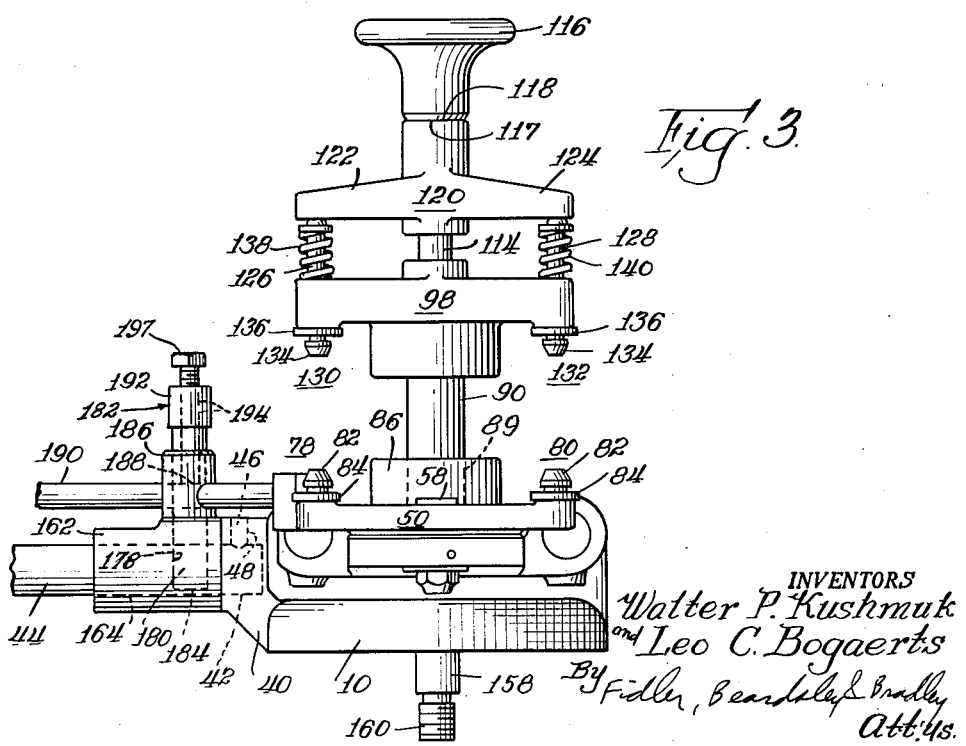

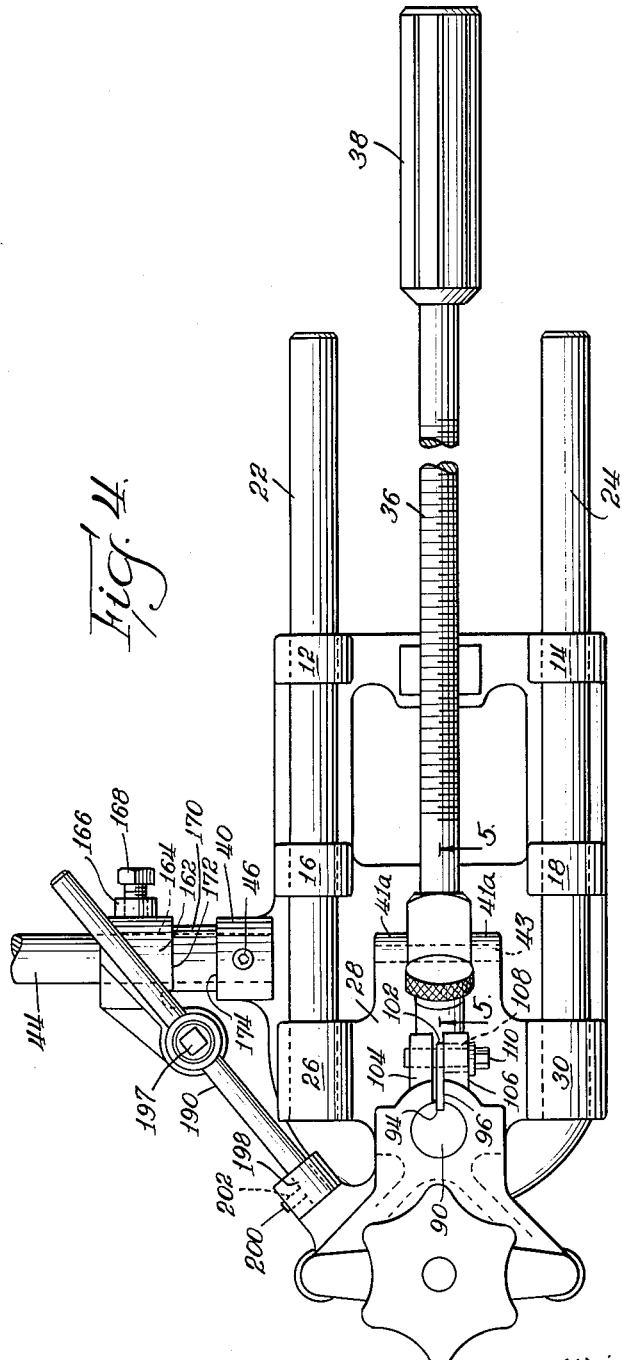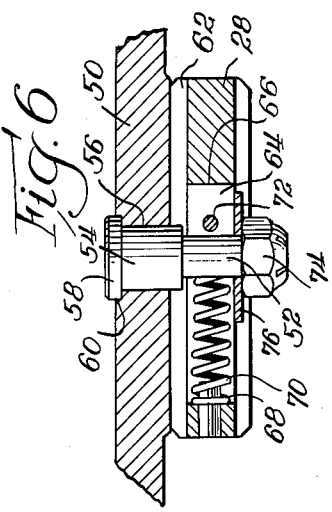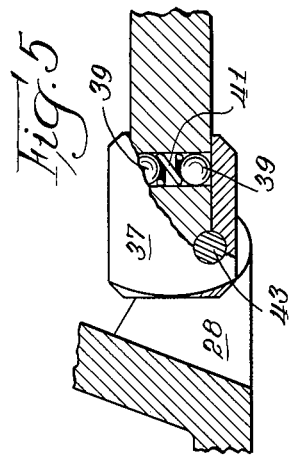

United States Patent Office 3,089,295
Patented May 14, 1963

3,089,295
BRAKE SHOE CLAMP
Walter P. Kushmuk, Niles, and Leo C. Bogaerts, Antioch, Ill., assignors to Ammco Tools, Inc., North Chicago, Ill., a corporation of Illinois
Filed June 5, 1961, Ser. No. 114,752
7 Claims. (Cl. 51—217)

This application relates to brake shoe clamps and particularly to brake shoe clamps which are adapted to hold a brake shoe of a vehicle brake while the brake lining on such brake shoe is being ground.

An object of the present invention is to provide a brake shoe clamp having two alternative motions either of which is easily selectable by an operator.

Another object of the present invention is to provide a brake shoe clamp having a universal action adapted to shape the lining on a brake shoe to the proper surface configuration for all of the common types of brake.

A further object of the present invention is to provide a brake shoe clamp in which distances which are critical in a lining grinding operation are readily fixed by selecting a replaceable sleeve of predetermined length.

The brake shoe clamp of the present invention is provided with a base portion adapted to be supported and rotated with respect to a fixed support. On the base portion is a body portion secured thereto in sliding relation, the sliding motion of said body portion being readily realizable by operation of a control arm.

The shoe clamp of the present invention is operated to provide a motion varying the position of the body with respect to the base. Brake shoes which are provided with an anchor adjustment are clamped to the body and subjected to a rectilinear motion while brake shoes having no anchor adjustment are subjected to a swinging motion. Either of these motions may be alternatively selected by making minor adjustments in the shoe clamp of the present invention.

Other objects and features of the invention will be brought out more fully in the following specification, in connection with the drawings in which:

FIG. 1 is a perspective view of a brake shoe clamp embodying the invention;

FIG. 2 is a side view of the apparatus illustrated in FIG. 1;

FIG. 3 is an end view of the apparatus illustrated in FIG. 1;

FIG. 4 is a plan view of the apparatus illustrated in FIG. 1;

FIG. 5 is a section of a portion of FIG. 4 taken along section 5—5; and

FIG. 6 is a section of a portion of FIG. 2 taken along section 6—6.

Referring now to the drawings, there is shown therein a brake shoe clamp having a base 10. The base 10 is a relatively flat member and is provided with two enlarged portions 12 and 14 at the rear thereof and two other enlarged portions 16 and 18 disposed forwardly of portions 12 and 14, each of which is provided a bore 20. The bore 20 of the enlarged portion 16 is in axial alignment with the bore 20 in portion 12, and both bores are adapted to receive a bar 22 which forms a way. The bores of enlarged portions 14 and 18 are also in axial alignment, and adapted to receive another bar 24, which forms a way parallel to the first way. Bar 22 is fixed to an enlarged portion 26 of the body 28 while bar 24 is attached to another enlarged portion 30 of the body 28, located opposite to enlarged portion 26, so that the body may be moved relative to the base by adjustment of the ways.

The base 10 is provided with a semi-circular bore 32 drilled along the top surface of an upstanding portion 34 located at the rear end of the base 10. Bore 32 is provided with screw threads and is adapted to receive a portion of a drive shaft control arm 36 having similar screw threads. Drive shaft 36 is provided with a handle 38 at one end, which handle may be turned so as to move the drive shaft 36 in a rectilinear fashion back and forth in a direction parallel to the axis of the drive shaft 36, and also parallel to the ways, by threading the drive shaft 36 through bore 32. When handle 38 is turned counter-clockwise, as viewed in FIG. 1, the entire body portion moves forward with respect to the base 10, and rectilinearity is insured by the guiding of bars 22 and 24 by the enlarged portions 12, 16, 18 and 20 of the base 10, within which bars 22 and 24 are disposed.

The other end of drive shaft 36 is disposed in a socket 37 (FIG. 5), and provided with bearings 39 urged apart by spring 41. The socket 37 is pinned between two rearwardly extending portions 41a of body 28 by pin 43. This permits shaft 36 to be raised out of bore 32 for rapid manual movement of the body during preliminary coarse adjustment of the clamp.

Base 10 is also provided with a laterally extending portion 40 having a bore 42 drilled therein adapted to receive a shaft 44. Shaft 44 is fixedly mounted in bore 42 and secured by a set screw 46 provided at the top of the outwardly extending portion 40.

A lower clamp support 50 is rotatably mounted on the body 28 by means of a shaft 52 as best shown in FIG. 6. Shaft 52 is provided with enlarged portion 54 which extends through a bore 56 in the lower clamp support 50, and another enlarged portion 58 which is seated in a recess 60 in the lower clamp support 50. The enlarged portion 54 extends slightly below the underneath surface of the lower clamp support 50 and is seated in a groove 62 which is disposed in the upper surface of the body 28 and which extends in a direction transverse to the direction of drive shaft 36. The enlarged portion 54 of shaft 52 slides in the groove 62 and makes movement of the body 26 with respect to the base 10 possible only in a predetermined motion, which will be hereinafter described.

The lower part of shaft 52 is received in a slot 64 extending from a portion of the bottom of groove 62 through the body 28, but shorter in length than groove 62. The movement of shaft 52 in each direction within slot 64 is limited by an end wall 68 and by a pin 72. A spring 70 is disposed between side wall 68 and shaft 52, forcing shaft 52 and the lower clamp support 50 rightwardly in slot 64 as viewed in FIG. 6. Rightward movement of shaft 52 is limited by the pin 72, which is seated in the body 28 in a position extending across the slot 64 and intersecting the path of shaft 52. Shaft 52 is maintained in the proper vertical position by a washer 76 thereon and a nut 74 threaded on the end thereof. Washer 76 is larger in diameter than the width of slot 64. Thus it is apparent that the lower clamp support 50 is permitted to move left and right with respect to body 28 as viewed in FIGS. 3 and 6, but is urged to normally assume the rightward position as shown in FIG. 6 bearing against pin 72. When in this rightward position, shaft 52 is located on a line coextensive with the axis of drive shaft 36.

The lower clamp support 50 is provided with two clamp members 78 and 80 which are firmly secured thereto on either side of enlarged portion 58 of shaft 52. Each clamp member includes a positioning pin 82 having a positioning surface and a retaining washer 84 having a clamping surface surrounding the positioning pin 82 and located on the surface of lower clamp support 50. The lower edge of the brake shoe (not shown) which forms the work piece is gripped by the retaining washers 84 while being held in position by the positioning pins 82.

Lower clamp support 50 is also provided with a rearwardly extending portion 86, which is strengthened in its position with respect to the horizontal surface of the lower clamp support 50 by means of a web 88. The rearwardly extending portion 86 is provided with a vertical bore 89 which receives a shaft 90. Shaft 90 is held in position within bore 89 by means of a pin 92 secured in a bore, drilled into the rearwardly extending portion 86 of the lower clamp support 50, which intersects bore 89. Pin 92 secures shaft 90 firmly to the lower clamp support 50 and prevents relative movement therebetween.

The upper end of shaft 90 is provided with a keyway 94 adapted to receive a key 96, for the purpose of securing the upper clamp support 98 to shaft 90, as will now be described.

Around shaft 90 there is disposed an upper clamp support 98 having a bore 100 drilled therein to receive shaft 90. A slot 102 is cut at the rear of upper clamp support 98, and is disposed in a vertical plane. The slot 102 is aligned with the keyway 94 in shaft 90 and receives a key 96, which maintains upper clamp support 98 in position with respect to shaft 90.

Slot 102 divides the rearwardly extending portion of upper shaft support 98 into two parts 104 and 106. A bore 108 is drilled through parts 104 and 106 and through key 96, and a bolt 110 is inserted in bore 108 through part 106 and the key 96 and then threaded into part 104. Bolt 110, when tightly drawn up, draws parts 104 and 106 together on opposite sides of key 96 and clamps the upper clamp support firmly to shaft 90, thereby fixing the vertical position of the upper clamp support 98 relative to the shaft 90.

The upper clamp support 98 is provided with a bore 112 extending vertically therethrough and receiving a shaft 114 in threaded engagement therewith. The upper end of shaft 114 is secured to a handle 116, so that as handle 116 is turned, shaft 114 is raised or lowered by threading shaft 114 through bore 112. A member 120 is slidably mounted on shaft 114 and is provided with an upper surface 117 which cooperates with a lower surface 118 of the handle 116. The handle 116 thus forces member 120 downwardly as it is turned.

Member 120 is provided with left and right arms 122 and 124, each of which is provided with a downwardly extending shaft 126 or 128 fixed thereto. Shaft 126 extends downwardly through the upper clamp support 98 and terminates in a clamp member 130. Similarly, shaft 128 extends through upper clamp support 98 and terminates in a clamp member 132. Each of the clamp members 130 and 132 is provided with a positioning pin 134 and a retaining washer 136, both of which are fixed to shaft 126 or shaft 128. Surrounding shaft 126 between the number 120 at the upper clamp support 98 is a spring 138 which acts to push the member 120 upwardly with respect to the upper clamp support 98. A similar spring 140 surrounds shaft 128 at the other side of the upper clamp support.

Thus it will be seen that the lower clamp support 50, the clamping members 78 and 80 carried thereby, the upper clamp support 98, the clamping members 130 and 132 carried thereby, the shaft 90, the member 120, the shafts 126 and 128, the springs 138 and 140, and the handle 116 together form clamping means carried by the body 28.

When handle 116 is turned in one direction, shaft 114, which is connected thereto is screwed into the upper clamp support 98 and lowers member 120 relative to upper clamp support 98. This lowering is resisted by springs 138 and 140 which urge member 120 upwardly.

A brake shoe is positioned in the clamp against the four positioning pins 82 and 134. Handle 116 is then turned so that the brake shoe is gripped between retaining washers 84 and 136 on the lower clamp support 50 and on the upper clamp support 98. The brake shoe is thus held in place during the grinding operation.

When the brake shoe is provided with an anchor adjustment in the vehicle brake in which it is employed, only a rectilinear motion of the brake shoe clamp is required. This motion arises from turning handle 38 of the drive shaft 36 which moves the body 28 forward in respect to the base 10. Although shaft 52 is slidable in slot 64 and groove 62 in the body 28 from side to side, it is retained from moving in a direction parallel to the axis of shaft 36, and therefore the upper and lower clamp supports are also caused to travel forward in a rectilinear fashion. During the travel the clamp supports are not permitted to rotate relative to the body 28 by virtue of a mechanism which will now be described.

Toward the rear end of the body 28 there is provided an upstanding portion 142 which is provided with a bore 144 having threads adapted to receive a threaded shaft 146 which has at its end a knurled wheel 148. The other end of shaft 146 is rounded and is adapted to engage a V-shaped groove 152 in the rearmost portion 86 of the lower clamp support 50. Groove 152 is cut into portion 86 in a position directly behind shaft 90 when the clamp members are located in a plane perpendicular to the axis of drive shaft 36. Thus, the clamp is locked and maintained in position by the action of shaft 146 nesting in the V-groove 152 cut into the lower clamp support 86.

Base 10 is provided with a vertical bore 154 within which is disposed a shaft 158 having an enlarged portion 156 at one end thereof and having a threaded portion 160 at the other end. Threaded portion 160 is adapted to be received in a convenient vertical bore, and the base 10 is rotated about the axis of shaft 158 by virtue of a pivoting motion applied to handle 38 of shaft 36. This pivoting movement is operative to cause all portions of the surface of the brake shoe to be ground to a depth dependent upon the extent of rectilinear movement applied to the body 28 with respect to the base 10.

When the brake shoe of which the brake lining is to be shaped is not provided with an anchor adjustment when in position in the brake of a vehicle, a swinging motion must be applied to the brake shoe during grinding to insure that a surface is formed on the brake lining of the brake shoe which corresponds exactly to the surface of the brake drum with which the shoe is to be used. This swinging motion is effected by a mechanism which will now be described.

It has already been observed that shaft 44 is firmly attached to the base 10. Slidably mounted on shaft 44 is a pivot support 162 provided with a bore 164 through which rod 44 passes. Pivot support 162 is provided with another bore 166 (FIG. 4), within which is seated a set screw 168, having threads matching corresponding threads within bore 166. The set screw 168 may be firmly tightened so as to secure in position pivot support 164 at a particular place along shaft 44. This position is insured by the length of the bushing 170 disposed on rod 44 between the outward surface of the laterally extending portion 40 of the base 10 and the pivot support 162. The surfaces of the two ends 172 and 174 of bushing 170 are machined to a high tolerance to insure an accurate length of the bushing. The corresponding surfaces of portion 40 and pivot support 162 are also machined so that the position on rod 44 of pivot support 162 is the same irrespective of the way in which bushing 170 is placed on rod 44. The bushing 170 serves as calibrated means for establishing the position of the pivot support 162 relative to the base portion 40.

Pivot support 162 is provided with an upstanding portion 176 which is provided with a vertical bore 178. Bore 178 receives the bottom portion 180 of a pivot pin indicated generally at 182. The bottom surface of the lower portion 180 of the pivot pin 182 rests on bottom 184 of bore 178, and pin 182 is free to rotate with respect thereto.

Pivot pin 182 is provided with a central portion 186 which has a horizontal bore 188 extending therethrough which bore is adapted to receive a rod 190. A top portion 192 of pivot pin 182 has a vertical bore 194 drilled into the horizontal bore 188. Within the bore 194 there is disposed a set screw 197 having threads cooperating with corresponding threads within the bore 194. Set screw 197 may be tightened against rod 190 to prevent rod 190 from moving within bore 188. Rod 190 and pivot pin 182 are, however, free to rotate about the axis of pivot pin 182, even though set screw 197 has been tightened.

The lower clamp support 50 is provided with an upstanding portion 196 which is provided with a bore 198 within which rod 190 is secured by means of a set screw 200 located in a bore 202 extending through the upstanding portion 196 of the lower clamp support 50 and intersecting the bore 198 within which rod 190 is disposed. Thus, rod 190 is fixedly connected to the lower clamp support 50, and when rod 190 rotates about the axis of pivot pin 182, the entire clamp assembly including the lower clamp support 50, the upper clamp support 98 and shaft 90 all rotate about pivot pin 182 together, provided that shaft 146 is not engaged in the V-groove 152 of the rear portion 86 of the lower clamp support 50.

After the brake shoe has been placed in position between the upper and lower clamp members, the knurled head 148 on shaft 146 is turned counterclockwise to release the end 150 of shaft 146 from the V-groove 152. Then the pivot support 162 is correctly positioned on shaft 44 by the insertion of a bushing 170 of predetermined length between portion 40 and pivot support 162, and set screws 168 and 196 are turned down tight. Then the handle 38 is turned to advance drive shaft 36, resulting in a swinging motion of the brake shoe by advancing the axis of shaft 52 while maintaining the axis of shaft 52 in its fixed position. The spring 70 insures that shaft 52 can be moved forward or backward without backlash. The resulting motion applied to the brake shoe held in position with clamp is a swinging motion about the two pivots provided by the shaft 52 and the pivot pin 182. When the brake shoe has been advanced far enough to engage the grinding mechanism, the entire assembly is pivoted about shaft 158 in the manner described hereinabove, to effect grinding of all portions of the surface of the shoe. This motion is continued while advancing the brake shoe with a swinging movement, until the surface of the brake shoe has been ground to a regular surface which matches that of the brake drum with which the brake shoe is to be used.

It will be seen from the foregoing that the clamp means can be advanced and retracted along either of two selectable paths. When the shaft 146 is tightened to lock the lower clamp support 50 to the control arm 36 and the rod 190 is disconnected from the pivot pin 182, the clamp means moves only forwardly and rearwardly along a rectilinear path as above described. On the other hand, when shaft 146 is disengaged from the lower clamp support 50 and the rod 190 is fixed in the pivot pin 182, the clamp is movable along an arcuate path as above described. Thus the clamp may be used in grinding a brake shoe of either the adjustable anchor type or the fixed anchor type.

It is to be understood that the above-described arrangement and construction of elements are merely illustrative of the invention and many modifications can be made without departing from the invention.

We claim:

1. In a device of the type described, the combination comprising an upper clamp member and a lower clamp member for holding a work piece therebetween, means interconnecting said clamp members for preventing relative angular movement of said clamp members, a body member, first connecting means connecting said clamp members to said body member providing for sliding movement of said clamp members relative to said body member in one direction and pivoting movement of said clamp members relative to said body member about a first axis, second connecting means connecting said clamp member to said body member for selectively preventing movement of said clamp members relative to said body member, a base member, third connecting means connecting said body member to said base member providing for sliding movement of said body member relative to said base member in a direction transverse to said one direction, fourth connecting means connecting said clamp members to said base member providing for pivoting movement of said clamp members relative to said base member about a second axis, means for selectively disabling said fourth connecting means, and manually operable means for moving said body member relative to said base member.

2. In a device of the type described, the combination comprising a base member, a body member, and a set of clamp members, said clamp members being mounted on said body member for sliding and pivoting movement with respect thereto, said body member being mounted on said base member for sliding movement with respect thereto, releasable first connecting means selectively operable for locking said clamp members to said body member, detachable second connecting means selectively operable for connecting said clamp members to said base member, said first connecting means determining a rectilinear motion of said clamp members relative to said base member and said second connecting means determining a swinging movement of said clamp members relative to said base member.

3. A brake shoe clamp for holding a brake shoe during a brake lining-grinding operation comprising a set of clamp members for holding said brake shoe, a pivotally supported base member having a control arm, said clamp members being coupled to said base member, said control arm being manually pivotable about said base pivot to impart a pivoting motion to said clamp members, and means selectively operable in response to rotation of said control arm about its own axis for advancing said clamp members into a lining-grinding position by one of two alternative motions, said last means including a releasable connection between said clamp members and said control arm and a detachable connection between said clamp members and said base member.

4. In a brake shoe clamp, the combination comprising a set of clamp members for holding said brake shoe, a base member having a pivot support attached thereto, drive means for advancing said clamp members relative to said base member in a swinging motion in a predetermined radius about an axis passing through said pivot support, said drive means including an arm connected between said clamp members and said axis, said arm serving to establish said predetermined radius, and means for establishing said axis in a predetermined position comprising adjustable connection means between said base and said pivot support including a rod secured to said base and slidably supporting said pivot support and calibrated means including a sleeve of predetermined length removably fitted over said rod to maintain said pivot support spaced a fixed distance from said base for maintaining a fixed distance between a reference point on said base and a reference point on said pivot support, whereby the location of said axis is fixed.

5. A universal brake shoe clamp for holding a brake shoe during a brake shoe lining-grinding operation capable of simulating motions of a plurality of different types of brake shoes comprising clamp means for clamping a brake shoe at a plurality of points on the edge of such shoe, drive means for imparting to said clamp means a selected advancing motion whereby a lining-grinding operation may be performed, first means for selecting a first and rectilinear motion for said drive means, second means for selecting a second and swinging motion for said drive means, means for disabling said first means when said second means is operative, means for disabling said second means when said first means is operative, and means associated with said drive means for superimposing a pivoting motion on said advancing motion.

6. A brake shoe grinder clamp comprising a base, a body member, means supporting said body member for rectilinear sliding movement on said base, means for advancing and retracting said body member on said base, brake shoe clamping means, means slidable relatively to said body member pivotally supporting said clamping means on said body member for movement thereon about a first pivot axis, detachable means pivotally connecting said body member to said base for movement about a second pivot axis, and releasable means for locking said clamping means to said body member and against pivotal movement on said body member.

7. A brake shoe grinder clamp comprising a base, a body member, means supporting said body member for rectilinear sliding movement on said base, means for advancing and retracting said body member on said base, brake shoe clamping means, means slidable relatively to said body member pivotally supporting said clamping means on said body member for movement about a pivot axis, pivot means, a pivot rod adjustably connected to said pivot means, means including a shaft carried by said base and slidably supporting said pivot means for adjustment thereof toward and away from said base, and a bushing member of predetermined length carried by said rod and interposed between said base and said pivot means for establishing the position of said pivot means on said shaft.

References Cited in the file of this patent

UNITED STATES PATENTS

| | | |
|---|---|---|
| 2,543,387 | Thomason | Feb. 27, 1951 |
| 2,644,281 | Thomason | July 7, 1953 |
| 2,715,799 | Billeter | Aug. 23, 1955 |
| 2,734,319 | Billeter | Feb. 14, 1956 |
| 2,820,331 | Billeter | Jan. 21, 1958 |
| 2,901,869 | Billeter | Sept. 1, 1959 |
| 2,939,254 | Thomason | June 7, 1960 |
| 3,022,610 | Barrett | Feb. 27, 1962 |

FOREIGN PATENTS

| | | |
|---|---|---|
| 938,216 | Germany | Jan. 26, 1956 |